UNITED STATES PATENT OFFICE.

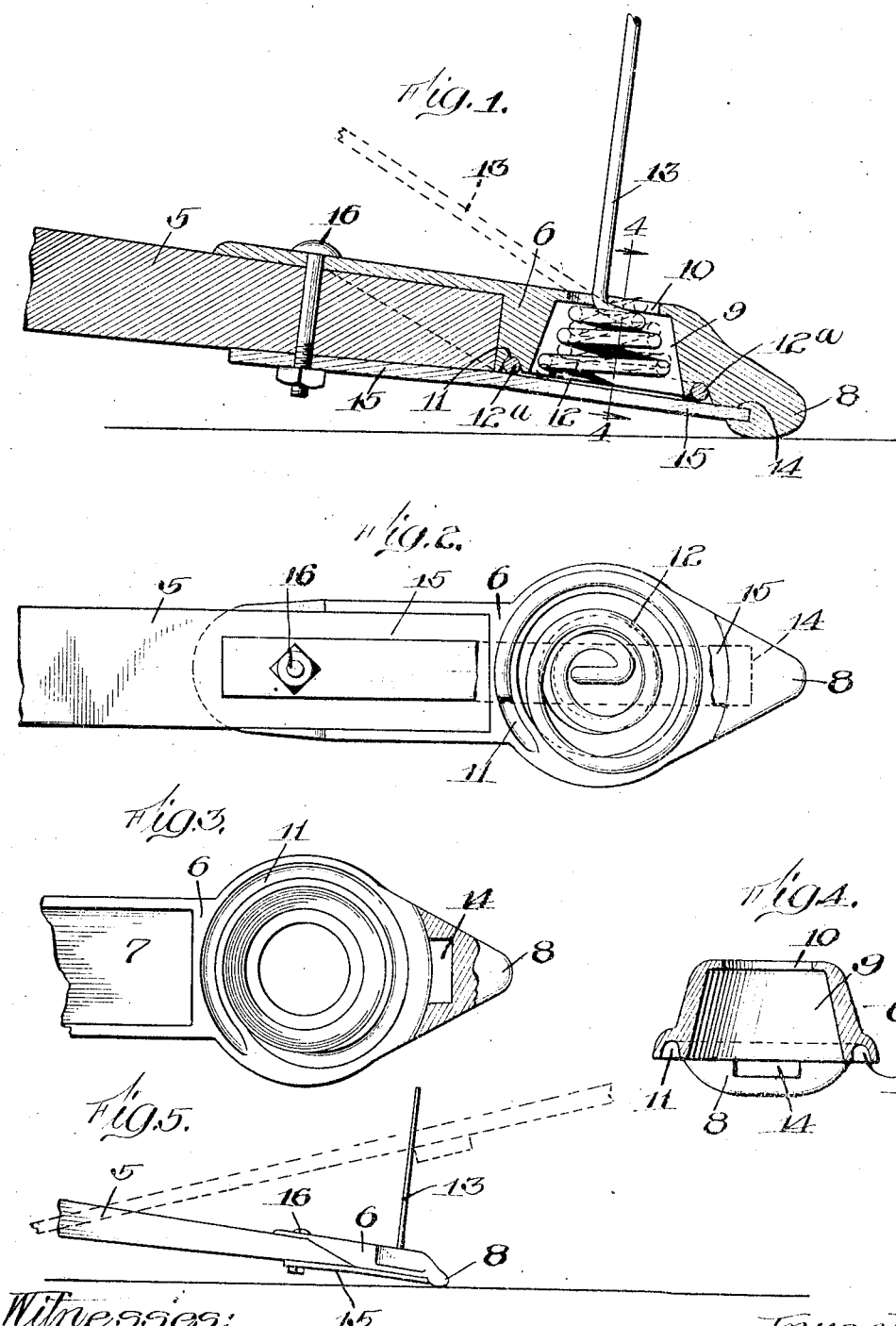

JOSEPH DAIN, OF OTTUMWA, IOWA.

STACKER-TOOTH.

No. 913,702.　　　Specification of Letters Patent.　　　Patented March 2, 1909.

Application filed July 9, 1906. Serial No. 325,410.

*To all whom it may concern:*

Be it known that I, JOSEPH DAIN, a citizen of the United States, residing at Ottumwa, in the county of Wapello and State of Iowa, have invented certain new and useful Improvements in Stacker-Teeth, of which the following is a specification, reference being had to the accompanying drawings.

My invention relates to teeth for the heads of hay-stackers.

As is well known hay-stackers are in use in which the hay is raked from the field upon a head or fork which consists of a number of teeth with suitable cross-bars and supports, and which when the hay is being raked upon it lies close to the ground. When a sufficient amount of hay is raked upon the stacker-head the stacker is set in operation and the head with its load of hay is lifted and the hay thrown upon the stack. Heretofore certain difficulties have occurred in its operation arising from the fact that when the rake, which has been driven up upon the stacker-head with its hay, is backed away to free it from the stacker-head and from the hay, it will drag a portion of the hay with it off from the stacker-head and cause a scattering of the hay and prevent its being cleanly taken up and deposited upon the stack. Several devices have been made for the purpose of doing away with these difficulties, but so far as I am aware all of them have objections. For instance, a device has been used consisting of a long bar and a number of spring teeth coiled around a pipe on one side of the bar. This bar has been staked to the ground just in front of the points of the teeth of the stacker-head, so that when the rake is driven up with its load of hay and deposited upon the stacker it would pass over these teeth bending them downward as the rake passed over them and allowing them to spring up again into vertical position as the rake passed them. While such devices would prevent the hay from being pulled back off the stacker-head by the rake, there were several objections to them. The teeth would tend to crystallize and break by being bent laterally; the device was separate from and not a part of the stacker-head, and as it remained fixed in its position, when the stacker-head rose, there was nothing to prevent the hay from falling off the stacker-head in the early part of its upward movement. Other devices have been used, but all subject to one objection or another.

It is the object of my invention to provide a new and improved tooth for stacker-heads which will overcome these difficulties; which will readily yield in any direction when the rake moves over the stacker-head to deposit the hay thereon; which will not crystallize and break under repeated strains in any direction; which will yield forward, backward and laterally, so that no matter at what angle the rake happens to be driven over the stacker-head the teeth will readily yield to permit the passage of the rake-bar over them, and which, being attached to the stacker-head and resuming their position as soon as free from the rake-bar, will rise with the stacker-head and prevent the spilling of hay during the rising. I attain these objects as illustrated in the drawings and hereinafter described.

That which I regard as new will be set forth in the claims.

In the accompanying drawings,—Figure 1 is a longitudinal section through the free end of a stacker tooth; Fig. 2 is a plan view of the bottom of the end of the stacker tooth with the retaining bar broken away; Fig. 3 is a bottom plan view of the cap placed upon the end of the stacker tooth with the spring removed; Fig. 4 is a section on line 4—4 of Fig. 1, with the spring and retaining bar removed; and Fig. 5 is a diagram, showing one of the stacker teeth and one of the teeth of the hay-rake in dotted lines to show its operation.

Referring to the drawings,—5 indicates one of the teeth of the stacker-head.

6 indicates a tooth-point, of iron, steel or any other metal, which is provided with a recess 7 (see Fig. 3) open at the bottom into which the end of the stacker tooth 5 is inserted abutting against the bottom of the recess, as best shown in Figs. 1 and 2. The other end of the point 6 is beveled away upon the sides and top to form a rounded point 8.

9 indicates a recess formed in the point 6, which is circular in cross section and narrows from the bottom toward the top and opens by a smaller opening 10 through the top of the point 6.

11 (see Figs. 2 and 3) indicates a spiral groove which is formed in the bottom of the point 6 outside of the opening 9 but running into the recess, as is best shown in Fig. 3, by reason of its being of a spiral shape and for the purpose hereinafter described.

12 indicates a coiled or helical spring, the lowest coil of which 12ª lies in the spiral groove 11 when the spring is in position in the opening 9, as is best shown in Figs. 1 and 2. The coils of the helical spring 12 gradually decrease in size toward the top so as to conform roughly to the shape of the opening 9, and the spring terminates in a straight portion 13 which rises through the opening 10 and projects upward a suitable distance at substantially right angles with the stacker tooth.

14 indicates a slot cut in the under side of the point 6 in advance of the forward portion of the groove 11.

15 indicates a bar, preferably of spring material, one end of which, when the spring is placed in position, is inserted into the slot 14 and the other end is brought up against the stacker tooth 5, where it is secured by a bolt 16 passing through the rear end of the tooth-point 6, through the tooth, and through the rear part of the bar 15. The groove 11 is not quite as deep as the thickness of the wire of spring and hence it will be readily seen that, as is best shown in Fig. 1, the lower coil of the spring by means of the bar 15 is tightly locked in the groove 11.

The operation of this device will be readily understood. When the rake with its load of hay is driven up over the stacker-head, the stacker teeth and the rake teeth will come into substantially the position shown in Fig. 5, in which is shown one of the stacker teeth and one of the rake teeth, the latter being shown in dotted lines with the crossbar in contact with the upright portion 13 of the spring. As the rake is driven further forward the upright portion 13 will yield, and the yielding will be brought about, not by a bending of the upright portion 13, but by a rocking of the coils of the spring upon one another, and the teeth will thus yield sufficiently to permit the rake bar to pass by them, when they will at once spring into vertical position. When the rake is backed away or drawn away it will readily be seen that these upright portions of the spring 13, which may be called spring teeth for identification, will prevent the hay which has been deposited on the stacker-head by the rake from being drawn off by the backward movement of the rake. The spring teeth will yield with the rocking action of the spring as the rake is backed, and springing again into vertical position will, of course, rise with the stacker teeth and prevent the hay from being spilled out backwards during the early portion of the upward movement. It will also be clear that no matter at what angle the rake bar happens to strike the spring teeth 13 they will yield without strain, as the spring can, of course, rock equally well in any direction to permit such yielding of the teeth.

The stacker-head, of course, may be of any approved form and construction. I have illustrated only one tooth of the stacker-head, as my invention is clearly shown thereby, and does not pertain to any other portions of the stacker.

It will be understood, of course, that in practice my device may be applied to each tooth of the stacker-head, or only to as many as may be found necessary for a proper and effectual operation.

It will be noted, also, that in my improved stacker-tooth, as shown and described, the bottom of the opening 9, in which the coiled portion of the spring lies, is open except for the comparatively narrow plate 15, thus preventing any accumulation of dirt and chaff or seed and small pieces of hay in the opening which would, otherwise, be apt to accumulate until the accumulation would interfere with the proper working of the spring.

That which I claim as my invention and desire to secure by Letters Patent is,—

1. In a stacker-tooth, the combination with the tooth, of a coiled spring mounted near the end of said tooth and having a straight upwardly-projecting portion, and means for securing the lower coil of said spring rigidly to said tooth, substantially as described.

2. In a stacker-tooth, the combination with the tooth and a chamber near the end of said tooth, of a coiled spring mounted in said chamber and having a projecting portion extending from said chamber above said tooth, and means for locking the lowest coil of said spring against said tooth, substantially as described.

3. In a stacker-tooth, the combination with the tooth, a tooth-point secured to the end of said tooth, and a chamber in said tooth-point substantially the shape of the frustum of a cone, of a helical spring mounted in said chamber and having an extension projecting upwardly above said tooth, and means for locking the lowest coil of said helical spring against the under side of said tooth-point, substantially as described.

4. In a stacker-tooth, the combination with the tooth, a tooth-point secured to the end of said tooth, and a chamber in said tooth-point substantially the shape of the frustum of a cone, of a helical spring mounted in said chamber and having an extension projecting upwardly above said tooth, a spiral groove on the under side of said tooth-point adapted to receive the lowest coil of said helical spring, and means for locking the lowest coil of said spring firmly in said groove, substantially as described.

5. In a stacker-tooth, the combination with the tooth, a tooth-point secured to the end of said tooth, and a chamber in said tooth-point substantially the shape of the frustum of a cone, of a helical spring mounted in said chamber and having an extension projecting upwardly above said tooth, a spiral groove on the under side of said tooth-point adapted to receive the lowest coil of said helical spring, and a bar adapted to be removably inserted into the under side of said tooth-point and when secured in position to lock the lowest coil of said helical spring in said spiral groove.

6. A hay-retaining device for stackers, consisting of a holder detachably applied to a stacker tooth and a finger movably mounted on the holder and normally held in the upright position.

7. The combination with a stacker head, of a series of yieldingly retained fingers mounted upon the teeth of the stacker head near their forward extremities, said fingers being adapted to yield readily in response to pressure toward the rear and have a tendency to resume their normal or upright position as the said rearwardly directed force ceases to act.

8. A hay retaining device for stackers consisting of a finger and a holder therefor, said finger being adapted to oscillate or swing in any direction.

9. The combination with a tooth of a stacker; of a hollow member carried by the tooth; and a finger mounted at its inner end within the hollow member and projecting through the latter.

10. The combination with the carrier teeth of a stacker, of tension-controlled hay-retaining fingers carried at the forward end of said teeth.

11. The combination with a stacker, of hay-retaining fingers mounted to swing at the forward end of the stacker; and means for placing the fingers under tension.

12. The combination with the teeth of a stacker; of tension-controlled means carried at the forward end of the teeth to retain the material upon the teeth.

13. The combination with the carrier teeth of a stacker; of a hollow member carried by each tooth; and a hay-retaining finger movably carried by each hollow member.

14. The combination with the carrier teeth of a stacker; of a hollow member carried by each tooth; and a tension controlled hay-retaining finger carried by each hollow member.

15. A device of the character described comprising a hollow member, and a finger mounted in said member and projecting therethrough.

16. A device of the character described comprising a hollow member, and a hay retaining finger projecting through said hollow member.

17. A device of the character described comprising a hollow member, and a tension controlled finger mounted in the member.

18. The combination with the carrier teeth of a stacker, of a hollow member carried by each tooth, a hay retaining finger carried by each hollow member, and tension controlling means arranged for coöperation with the finger.

19. The combination with the carrier teeth of a stacker, of an independent tension controlled hay retaining finger carried by each tooth.

20. The combination with the teeth of a stacker; of a hollow member secured to each tooth and provided with a slot; a swinging hay-retaining finger mounted at its inner end within said hollow member and projecting through said slot; and means confined within the hollow member to control said finger.

21. The combination with a carrier tooth of a stacker, of an independent tension-controlled hay-retaining finger carried thereby.

22. A device of the character described comprising a hollow casting; a hay-retaining finger carried by the casting; and a spring confined within the casting for coöperation with said finger.

23. A device of the character described comprising a hollow member, a finger mounted in said member and having movement independently thereof.

24. A device of the character described comprising a hollow member, a finger mounted in said member and having movement independently thereof, and a spring arranged for engagement with the finger.

25. A device of the character described comprising a hollow member, a finger yieldingly mounted in the member and projecting therethrough, and means within the member to control the finger.

26. A device of the character described comprising a hollow member, a finger mounted in said member and having movement independently thereof, and a tensioning means in said member to control the finger.

27. A device of the class described, comprising a hollow member, a finger mounted in the member and having movement independently thereof, and a spring confined within the member to control the finger.

28. A device of the class described comprising a hollow member, a finger mounted in the member for movement independently thereof, and a spring arranged to control the finger.

29. A device of the character described comprising a hollow member, a movable hay retaining finger, said hollow member having oppositely disposed stops to limit the movement of the finger.

30. A device of the character described comprising a hollow member, a movable hay retaining finger, said hollow member having oppositely disposed stops to limit the movement of the finger, and means arranged to control the finger 31. The combination with the carrier teeth of a stacker, of a hay retaining finger carried at the forward end of each tooth of the stacker and arranged for movement independently of the teeth, and independent tension controlling means for each finger.

JOSEPH DAIN.

Witnesses:
C. A LASSER,
W. G. DUFFIELD.